United States Patent Office 3,507,293
Patented Apr. 21, 1970

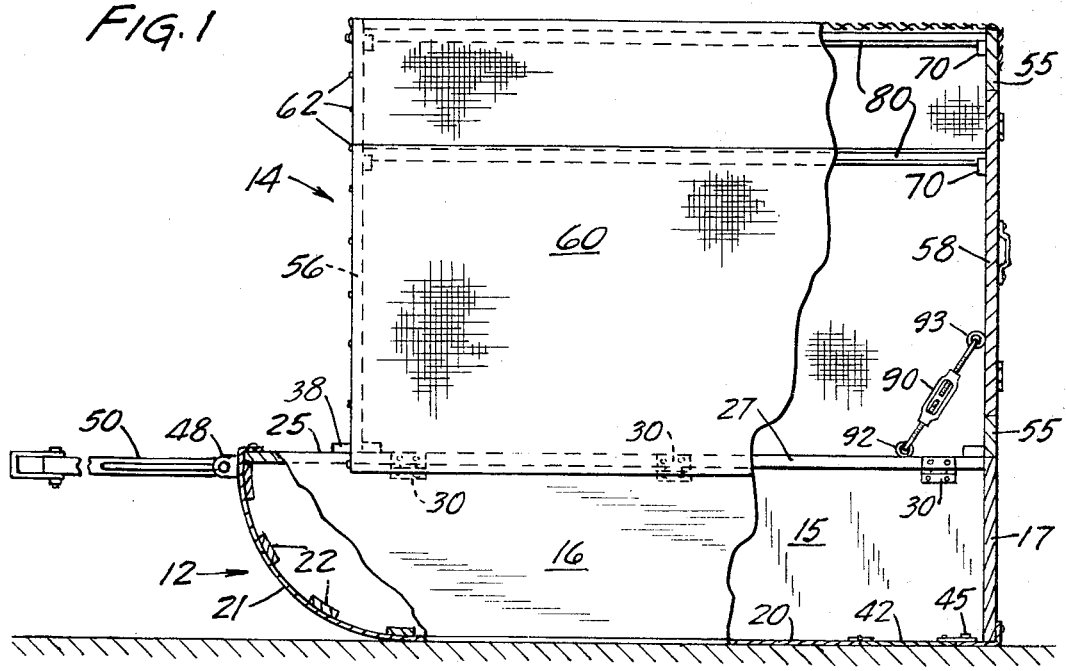
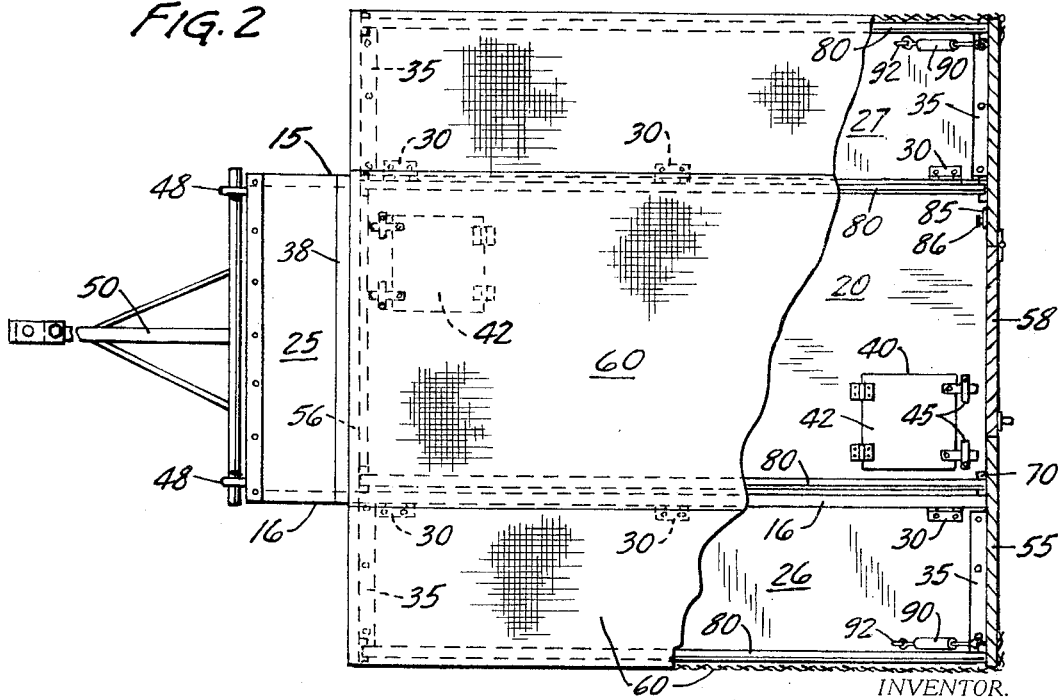

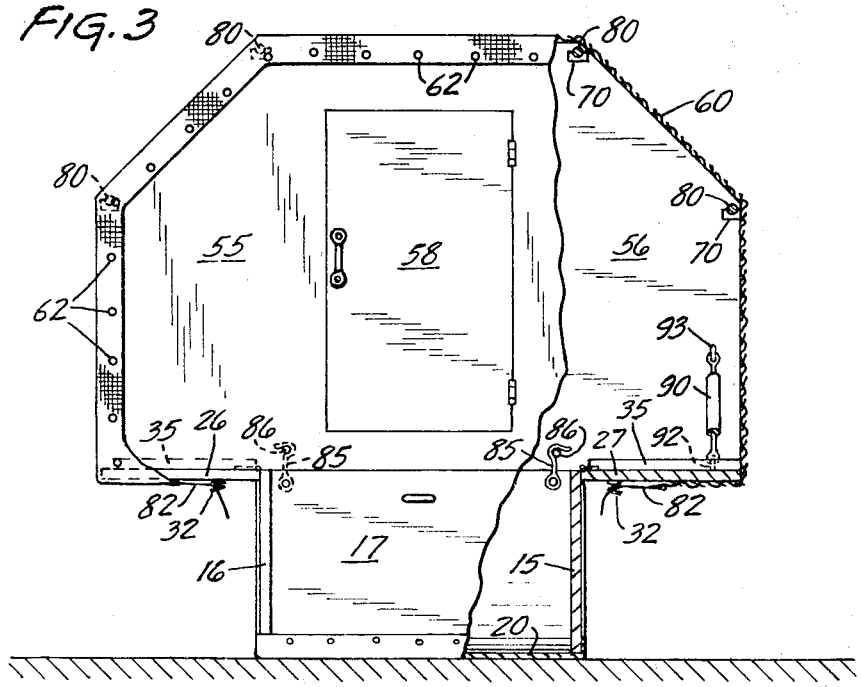
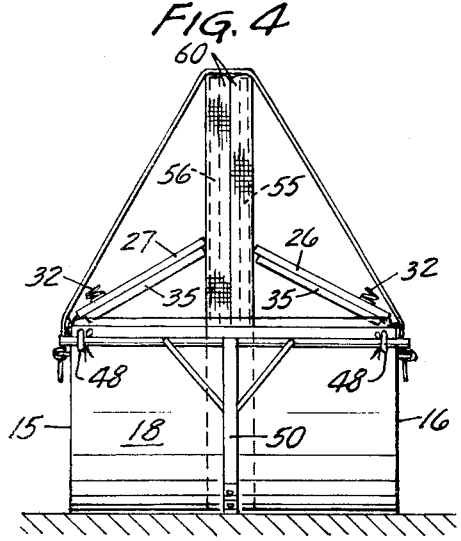
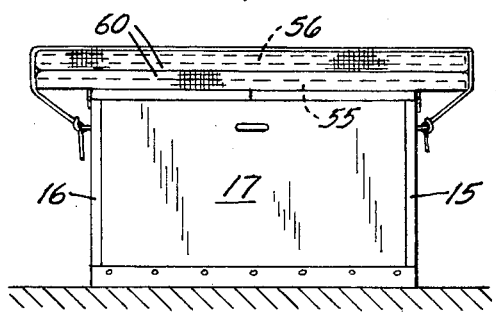

3,507,293
PORTABLE AND COLLAPSIBLE FISH HOUSE
Kenneth D. Du Bray, 8527 Monroe St. NE.,
Minneapolis, Minn. 55433
Filed Nov. 13, 1968, Ser. No. 775,294
Int. Cl. A45f 1/00, 1/16
U.S. Cl. 135—4                     9 Claims

ABSTRACT OF THE DISCLOSURE

A portable and collapsible fish house having a base structure with a tobaggan type bottom for ease in movement with a collapsible top structure which mounts thereon to provide a weather tight enclosure. The base structure has foldable cover members which provide seat surfaces in an erected position and the top structure has an access door for ease of usage.

---

This invention relates to ice fishing shelters and more particularly to a shelter or fish house of this type which is portable and collapsible for ease in transportation and usage.

Ice fishing shelters or fish houses have taken a variety of forms. Such structures in the past have been collapsible to facilitate transportation of the same and permit movement of the houses to various locations for angling purposes. Where such structures are made portable, it is conventional to incorporate runners, skids or other similar surfaces to increase mobility of the same. Such prior structures, however, have generally been limited in size to use by a single angler, have not incorporated seats therein and have not been relatively secure from a weather standpoint. The improved portable and collapsible fish house of the present invention is constructed to permit movement manually or by snowmobile to a variety of locations permitting angling at various sites without restriction. In addition, the improved structure approaches the permanent type ice fishing shelter designed for use by a plurality of fishermen in that it incorporates seating surfaces and angling holes together with overall supporting and shielding structure as to make it usable under all weather conditions. It is constructed of a lightweight material such that it may be readily moved and incorporates a base structure which is generally toboggan shaped to facilitate such movement. The base structure has side structures and the cover hinged thereon which is designed to be positioned relative to the side surfaces to form a seating surface. The fishing shelter further includes a detachable top structure which is collapsible for storing and handling purposes.

It is therefore the principal object of this invention to provide an improved fish house which is portable and collapsible.

Another object of this invention is to provide a fish house which is readily transported, erected and taken down.

A still further object of this invention is to provide a fish house of this general type which is light in weight so as to be capable of being hand drawn or moved by small motive machines, such as snowmobiles.

A still further object of this invention is to provide a fish house which is relatively low in cost and easy to use and maintain.

These and other objects of this invention will become apparent from a reading of the attached description, together with the drawings wherein:

FIGURE 1 is a side elevation view of the improved portable and collapsible fish house in an extended or erected position with parts broken away;

FIGURE 2 is a plan view of the improved portable and collapsible fish house of FIGURE 1 with parts broken away;

FIGURE 3 is a rear view of the improved portable and collapsible fish house of FIGURE 1 with parts broken away;

FIGURE 4 is a front elevation view of the improved portable and collapsible fish house in a collapsed condition showing one condition for transportation; and FIGURE 5 is a rear view of the improved portable and collapsible fish house in a collapsed condition showing a second position or condition for transportation.

My invention in a portable and collapsible fish house is shown in the drawings, generally at 10, as incorporating a base or bottom structure, indicated at 12, which mounts a top structure, indicated generally at 14, the top and bottom structures fitting together and being secured together to form an overall housing in which anglers may sit protected from the elements and angle or fish through holes in an ice surface on the lake corresponding to suitable access openings to be later defined in the bottom structure in contact with the lake. This improved fish house has a generally toboggan shaped bottom structure such that it is particularly adapted to be manually or motively drawn across the snow or ice surface for ease in transportation and, as will be hereinafter identified, collapses into convenient conditions and positions for such purposes.

The bottom or base structure 12 is generally rectangular in shape having side walls 15, 16, a rear wall 17 and a curved front wall 21 which fit together and are suitably connected to form the generally toboggan shaped structure. The base of this front wall and bottom 20 of the base structure is formed by a metal sheet covering, such as a thin sheet of steel, suitably secured to the side and rear walls for strength and ease in moving the same on ice and snow. The front wall includes, in addition, reinforcing ribs 22 and the entire wall structures apart from the metallic sheet bottom are formed of a lightweight wood material such as plywood. The top of this base structure includes a short fixed deck section 25 and a pair of cover members 26, 27 which are hinged on the respective sides 16 and 15 through suitable hinge members 30 to pivot thereon. In the closed or near abutting position of the cover or door sections 26, 27 a substantially flush or top surface is provided substantially enclosing the base structure for transportation purposes, as will be hereinafter defined. This exposed surface includes a plurality of spaced hook or retaining members 32 thereon and the hinges 30 are so positioned between the cover or door sections 26, 27 and the respective side walls as to permit pivoting of these door members in an opposite direction or away from one another such that they may be disposed substantially normal to the side walls and extending out from the base structure. The opposite surface of these door sections provide a seat surface for the fish house, as will be hereinafter defined. Positioned on the seat surface side of the respective cover members or doors are rib members 35 which serve to mount the top structure 14, as will be hereinafter defined. In addition, the deck portion 25 has a raised rib section 38 spaced from the cover or door member 26, 27 for the same purpose. The bottom or base structure at the bottom surface 20 includes a plurality of access openings, one of which is indicated at 40, with suitable pivoted access door 42 thereon by means of which an opening through the bottom wall is provided such that access may be obtained therethrough for fishing purposes. Only one such access opening is shown but it will be understood that several may be included in the bottom portion. The access door is made of a metal sheet corresponding to the sheet metal bottom 20 of the base structure to coincide with an appropriate opening therethrough such that a continuous metal surface would be provided for the base structure when the doors 42 were closed. Suitable latch members, indicated at 45, are positioned at the opposite edge of the door 42 to secure the door in locked position for transportation. As is conventional for fish houses, such access doors are open when the house is in usage and provide exposure or access to the ice or lake surface such that appropriate fish holes may be drilled therethrough for angling.

The base portion 12 at the top of the curved front wall 18 includes a pair of eye type journal members 48 which pivotally mount a draw bar, indicated generally at 50, by means of which the fish house may be connected to any type of draft means for towing or transportation purposes. Thus, for example, the toboggan type base structure may be drawn across ice or snow on a lake surface through the medium of an automobile, by hand or through such a motive means as a snowmobile. Because of its lightweight nature and the collapsible feature, as will be hereinafter described, and because of the materials employed, such a structure is suitable for handling by a snowmobile.

The top structure of the collapsible fish house incorporates two solid end walls 55, 56 corresponding to the back and front portions of the base structure respectively. The back structure 55 includes a pivoted door section 58 which is conventionally hinged on the remaining portion as to provide access to the interior of the fish house in an erected position. Any suitable materials may be employed but preferably a lightweight plywood construction such as is incorporated into the base is preferred. The sides and top of the top structure are formed by a collapsible fabric material, such as canvas, indicated at 60, which is connected to the peripheral or edge surfaces of the end walls 55, 56 through a permanent or removable type connection, as for example, eyelets or snap fasteners indicated generally at 62. This top structure is normally adapted to be transported in a collapsed position in which the end walls are brought together in near abutting relationship and with the canvas or flexible cloth material collapsed between the same. As will be hereinafter defined, this may be placed on top of the base structure for transportation purposes or positioned within the same.

The width of the end walls 55, 56 correspond to the distance between the outer edges of the seat or cover members 26, 27 of the base structure when pivoted to an opposite or open position. In the erection of the collapsible fish house, the end wall members are positioned apart as far as the canvas material forming the side and top walls of the top structure permit and in this position will be separated a distance such that the bottom edges of the same will be disposed outside of the ribs 35 positioned on the under surface or seat surface of the cover members 26, 27 when pivoted to the extended position. The front wall member 56 will also be disposed adjacent the rib 38 on the deck portion 25 of the base structure to accurately position the same. The edges of the end wall sections or members 55, 56 will correspond with or be positioned above the outer edges of the seat formed by the pivoted cover members such that the canvas side walls will be positioned over the same and may be wrapped around the under surface of the cover members in this position. The inner surface of the end wall members 55, 56 at the upper corners thereof include U-shaped bracket or mounting members 70 which may be made of a wood or metal material and which mount or support one end in a spacing pole, indicated generally at 80, which extend between the end wall members 55, 56 at the respective covers. In the configuration shown in the drawings, the collapsible top structure as defined by the shape of the end walls 55, 56 has a flat roof and tapered roof sections disposed of either side of the same to define four upper corners in which the spacing or support poles are positioned with appropriate mounting brackets 70 supporting the same. This will stretch the canvas to a generally taut position and define the overall shape of the top structure which fits over the base structure with the seats in the extended position. The ends of the canvas sides are tied through suitable rope extremities, indicated at 82, to the loops 32 on the underside of the seat surfaces or opposite side of the seat surfaces on the cover members which would be normally exposed on top when the base structure is collapsed to the transport position. This will draw the canvas taut at the bottom of the same making the structure relatively tight.

The entire top structure is held in position on the base structure by means of suitable hooks 85 which are pivoted on the inner wall surfaces of the base structure, that is the back wall and deck, and loop over or through suitable post or eyelet type securing members, such as is indicated at 86, attached to the inner wall surfaces of the end wall members 55, 56 of the top structure. This will hold the top structure down on the base structure in the assembled position. The cover members in the pivoted position to form the seats will be supported on the end wall members 55, 56 through suitable turnbuckle linkages 90 which are pivotally connected to the seat surfaces at the outer peripheral edges of the same, as indicated at 92, and which connect through suitable loops, indicated at 93, on the end wall sections at the inner surfaces thereof and near the edges of the same. The turnbuckles will permit adjustment of the level of the seat as well as support the same such that the seat will present a rigid surface for the occupants of the fish house during angling.

My improved portable and collapsible fish house is shown in FIGURE 4 in one mode of transport. For example, the fish house can be partially collapsed and the top structure housed within the bottom structure for short distance transportation such as moving to various locations on a lake or between fishing sites where it is not desirable to transfer the fish house in an erected position or condition. In this mode of transport, the top structure is collapsed by removal of the spacing poles 80 from the interior of the fish house and the release of the turnbuckles 90 from their connections 93 together with the hooks 85 from their retaining studs or eyelets. With this portion of the top structure dismantled, and with the canvas sides loosened from the seat portions 26, 27, the top structure may be removed and the canvas between the end walls 55, 56 collapsed between the same. The poles 80 may be stored in the bottom of the base structure 12 and the end walls in their collapsed position with the canvas therebetween may be set in the opening of the base structure with the cover members 26, 27 raised so they are inclined to or rest against the collapsed top structure. Suitable means may be used to secure the cover members 26, 27 in this position such as ropes, and the entire contents of the fish house may be transported by suitable draft means towing the same with the top structure so positioned therein to any desired location.

Whenever it is necessary to transport the fish house for long distances or when placing the house in storage, it may be desirable to fold the cover members 26, 27 down to their rest position to complete the enclosure. Under these conditions, the poles 80 may be stored therein but the top structure in a folded position will be positioned on the top of the base structure and tied thereon or otherwise transported and stored. Thus, in FIGURE 5, the base structure is shown with the covers members 26, 27 in a closed position providing a substantially flushed or enclosed top surface to the base structure and with the top structure in a collapsed position and positioned thereon.

My improved portable and collapsible fish house may be readily stored and transported to places of usage. Because of the lightweight construction, it is suitable for towing with a snowmobile and at the site of usage, may be readily erected by opening the base structure such that the cover members 26, 27 become seats and with the expansion of the top structure and the positioning of the same thereon so that the end walls 55, 56 are rigidly positioned thereon and connected thereto as described above. The retaining hooks 85 will secure the end walls on the base structure, and the turnbuckle fasteners 90 on the seats when connected to the eyes 93 in the end walls will permit rigid positioning of the seat members relative to the base member to provide an overall structure which will support the weight of an occupant or user and will provide a rigid and weather tight structure. Access to the fish house through the door permits ease in usage and the access openings or door 42 in the base structure permit the drilling of fishing holes and fishing from the interior of the house. The access doors have a suitable metal surface such as to complete the sledding or wear surfaces on the bottom so that the structure may be dragged between locations in a conventional manner.

What is claimed is:

1. A portable and collapsible fish house comprising, a toboggan type base structure having a raised side and end walls together with a curved front wall and bottom wall having a metallic surface, a pair of cover means pivotally mounted on the raised side walls of the base structure and adapted to be pivoted toward and away from one another to provide an enclosed cover surface for the base structure in one position and a seat surface on the side walls in a second position, a collapsible top structure adapted to be mounted on the base structure with a cover means positioned in the second position away from one another to provide the seat surfaces such as to enclose the same with the opposed seats interior of the top structure, access opening means positioned in the bottom surface of the base structure, and means to selectively connect the collapsible top structure to the base structure to hold the top structure in an erected position and the seat surfaces of the cover means connected to the top structure.

2. The portable and collapsible fish house of claim 1 in which the collapsible top structure has two solid opposite end walls which correspond to front and rear walls of the base structure with collapsible side and top walls connected therebetween.

3. The portable and collapsible fish house of claim 2 in which one of the solid opposite end walls of the top structure has a door positioned therein.

4. The portable and collapsible fish house of claim 1 and including pivoted tow bar means connected to the curved front wall of the base structure.

5. The portable and collapsible fish house of claim 2 in which the selectively connected means to hold the collapsible top structure in an extended position includes ribs on the seat surfaces of the cover means and fastening means extending between the base structure and the solid end walls together with turnbuckle means connected between the seat surfaces and the collapsible end walls and spacer means positioned between the upper extremities of the collapsible end walls of the top structure.

6. The portable and collapsible fish house of claim 5 in which the collapsible side and top walls of the top structure are formed of a canvas material and which is adapted to collapse between the solid end walls for storing and transportation purposes.

7. The portable and collapsible fish house of claim 2 in which the cover means are a pair of door members hinged to the sides of the base structure which when pivoted to near abutting relation over the top of the base structure form a substantially flush cover and when pivoted in the opposite direction form a seat structure with supporting ribs at the edges of the same to support the solid opposite end walls of the collapsible top structure, and including hook means connected between the end walls and the base structure to secure the same thereon and removable turnbuckle means connected between the ends of the door members and the end walls of the collapsible top structure to support the door members in a position substantially normal to the side walls of the base structure to define the seat surface for the fish house.

8. The portable and collapsible fish house of claim 7 in which the side, end and cover members of the base structure and the end walls of the top structure are formed of a plywood material and in which the remaining portion of the top structure is formed of a collapsible cloth material.

9. The portable and collapsible fish house of claim 5 in which the end wall members of the top structure include generally U-shaped support flanges at the upper periphery thereof for positioning poles to separate the upper ends of the end walls for the top structure and define the form of the collapsible structure in an extended position.

References Cited

UNITED STATES PATENTS

| | | | |
|---|---|---|---|
| 2,464,884 | 3/1949 | Noyes | 135—1 X |
| 2,473,076 | 6/1949 | Scheibner | 135—4 X |
| 2,632,454 | 3/1953 | Skogen | 135—4 |
| 2,717,160 | 9/1955 | Schmidt | 135—4 X |
| 2,891,562 | 6/1959 | Kruczynski | 135—1 |
| 3,157,185 | 11/1964 | Schoenike | 135—4 |
| 3,352,313 | 11/1967 | Kroening | 135—1 |
| 3,454,020 | 7/1969 | Grossman | 135—1 |

J. KARL BELL, Primary Examiner